United States Patent
Cho et al.

(10) Patent No.: US 9,784,234 B2
(45) Date of Patent: Oct. 10, 2017

(54) METAL SHELL OF GLOW PLUG FOR DIESEL ENGINES AND METHOD OF MANUFACTURING THE SAME

(71) Applicant: WOO JIN IND. CO., LTD., Ansan-si, Gyeonggi-do (KR)

(72) Inventors: Young Jin Cho, Ansan-si (KR); Byung Won Lee, Ansan-si (KR)

(73) Assignee: WOO JIN IND. CO., LTD., Ansan-si, Gyeonggi-do (KR)

( * ) Notice: Subject to any disclaimer, the term of this patent is extended or adjusted under 35 U.S.C. 154(b) by 0 days.

(21) Appl. No.: 14/896,399

(22) PCT Filed: Oct. 22, 2013

(86) PCT No.: PCT/KR2013/009429
§ 371 (c)(1),
(2) Date: Dec. 6, 2015

(87) PCT Pub. No.: WO2014/196698
PCT Pub. Date: Dec. 11, 2014

(65) Prior Publication Data
US 2016/0123293 A1    May 5, 2016

(30) Foreign Application Priority Data
Jun. 5, 2013 (KR) .................. 10-2013-0064709

(51) Int. Cl.
*F02P 19/02* (2006.01)
*F23Q 7/00* (2006.01)
(Continued)

(52) U.S. Cl.
CPC .............. *F02P 19/02* (2013.01); *B21K 21/08* (2013.01); *B23K 26/323* (2015.10); *F23Q 7/001* (2013.01);
(Continued)

(58) Field of Classification Search
CPC ......... B21K 21/08; B23K 26/323; F23Q 7/00; F23Q 7/001; F23Q 7/22; F23Q 2007/002;
(Continued)

(56) References Cited

U.S. PATENT DOCUMENTS 5,304,778 A * 4/1994 Dasgupta ................ F23Q 7/001
                                              123/145 A
6,285,007 B1 * 9/2001 Chiu .................... F02B 23/0657
                                              123/145 A
(Continued)

FOREIGN PATENT DOCUMENTS

EP          2469171 A1      6/2012
JP       2009-228988 A     10/2009
KR   10-2011-0000566 A      1/2011

OTHER PUBLICATIONS

International Search Report in International Application No. PCT/KR2013/009429, dated Feb. 24, 2014.

*Primary Examiner* — John Kwon
*Assistant Examiner* — Johnny H Hoang
(74) *Attorney, Agent, or Firm* — Park, Kim & Suh, LLC

(57) ABSTRACT

A metal shell of a glow plug mounted on an engine head of a diesel engine and a method of manufacturing the same are disclosed. The metal shell has an improved multi-stage structure, which allows the metal shell to be easily manufactured regardless of overall length of the metal shell and allows a metal shell section fastened to the engine head and at least one of the other metal shell sections to have different material strengths, thereby increasing fastening strength of the metal shell to the engine head and preventing warpage of the metal shell while improving productivity while reducing manufacturing costs. The metal shell of a glow plug for diesel engines according to the invention includes a plurality (Continued)

of metal shell sections disposed in an axial direction of the glow plug and having different material strengths.

10 Claims, 7 Drawing Sheets

(51) Int. Cl.
  *B23K 26/323* (2014.01)
  *B21K 21/08* (2006.01)
  *B23K 103/18* (2006.01)
(52) U.S. Cl.
  CPC .... *B23K 2203/18* (2013.01); *F23Q 2007/004* (2013.01)
(58) Field of Classification Search
  CPC ... F23Q 2007/005; G01M 15/08; F02P 19/00; F02P 19/028
  USPC ..... 123/143 B, 143 R, 145 A, 145 R, 169 R; 219/270
  See application file for complete search history.

(56) References Cited

U.S. PATENT DOCUMENTS

| | | | | |
|---|---|---|---|---|
| 6,465,759 | B1* | 10/2002 | Simpkins | F02B 23/0657 123/145 A |
| 6,512,204 | B1* | 1/2003 | Chiu | F02B 23/0657 123/145 A |
| 7,692,118 | B2 | 4/2010 | Itoh et al. | |
| 8,297,115 | B2 | 10/2012 | Borgers et al. | |
| 2002/0190049 | A1* | 12/2002 | Terada | F23Q 7/001 219/270 |
| 2006/0037394 | A1* | 2/2006 | Shiffer | G01D 11/245 73/431 |
| 2013/0269642 | A1* | 10/2013 | Ratosa | F23Q 7/001 123/145 A |
| 2013/0312691 | A1* | 11/2013 | Harada | F23Q 7/001 123/145 A |
| 2014/0138373 | A1* | 5/2014 | Takatsu | F02P 19/026 219/270 |
| 2014/0373800 | A1* | 12/2014 | Hirata | F23Q 7/001 123/145 A |
| 2015/0014302 | A1* | 1/2015 | Ikai | H05B 3/48 219/544 |
| 2015/0047592 | A1* | 2/2015 | Watanabe | G01L 23/221 123/145 A |

\* cited by examiner

METAL SHELL OF GLOW PLUG FOR DIESEL ENGINES AND METHOD OF MANUFACTURING THE SAME

CROSS-REFERENCE TO RELATED APPLICATIONS

This application is the National Stage filing under 35 U.S.C. 371 of International Application No. PCT/KR2013/009429, filed on Oct. 22, 2013, which claims the benefit of Korean Patent Application No. 10-2013-0064709, filed on Jun. 5, 2013, the contents of which are all hereby incorporated by reference herein in their entirety.

TECHNICAL FIELD

The present invention relates to a metal shell of a glow plug mounted on a diesel engine. More particularly, the present invention relates to a metal shell of a glow plug fastened to an engine head, wherein the metal shell has a multi-stage structure, in which at least two metal shell sections that can be easily machined regardless of overall length of the metal shell are axially connected to each other, and which allows strength of the metal shell to be partially improved, for example, by forming a portion of the metal shell fastened to the engine head and other portions with materials having different strengths, thereby increasing fastening strength of the metal shell to the engine head while preventing warpage of the metal shell, and a method of manufacturing the same.

BACKGROUND ART

Generally, since diesel engines can be difficult to start in cold weather, diesel engines are provided with a glow plug as a preheating means for securing startability at an upper portion of a combustion chamber adjacent to an injector. Such a glow plug serves to aid in starting of the diesel engines by heating cold outside air.

FIG. 1 is a front view of a typical glow plug; FIG. 2 is a front view of a unitary metal shell used in a typical glow plug; and FIG. 3 is a reference sectional view showing a state in which a typical glow plug is mounted on an engine.

Referring to FIGS. 1 to 3, a typical glow plug 10a includes a plug's metal shell 100a (hereinafter, "metal shell") having threads on an upper outer circumferential surface thereof for mounting the glow plug on an engine head 1 and a heating pin 200 disposed to axially pass through the metal shell 100a.

The heating pin 200 has a heating portion exposed below the metal shell 100a and a terminal disposed above the metal shell 100a, and the metal shell 100a has a through-hole formed therethrough in an axial direction such that the heating pin can be fitted into the through-hole.

The through-hole of the metal shell 100a is formed with a press fitting portion for interference fitting of the heating pin 200.

Such a typical glow plug 10a generates heat when receiving electric power from a battery, thereby heating air or functioning as a hot spot, and some of sprayed fuel directly impinges and evaporates on a hot surface of the glow plug 10a to ignite itself.

However, there are several problems in use of such a typical glow plug 10a for a direct injection type diesel engine.

Recently, as a fuel injection method for diesel engines has been changed from indirect injection type to direct injection type, the glow plug 10a has become longer and thus the overall length of the metal shell 100a has been increased. This causes a problem in that, when the glow plug 10a is mounted on the engine head of the diesel engine, the metal shell 100a suffers from warpage due to compressive load applied to the metal shell.

In addition, increase in overall length of the metal shell 100a is accompanied by deterioration in processability in manufacture of the metal shell.

A glow plug is disposed in a pre-combustion chamber (indirect injection type engine) or in a main combustion chamber (direct injection type engine) depending upon the kind of fuel injection. A glow plug disposed in a pre-combustion chamber, which is a small combustion chamber separated from a main combustion chamber, is shorter than a glow plug disposed in a main combustion chamber. Recently, there is increasing demand for a direct injection type diesel engine.

On the other hand, in order to prevent warpage in mounting the metal shell 100a having a long overall length on an engine, high strength materials may be used to manufacture such a metal shell. However, this causes considerable increase in manufacturing costs of the metal shell 100a as well as difficulty in processing the metal shell 100a.

A typical metal shell 100a is generally manufactured by cutting or forging. When the metal shell 100a having a long overall length for the glow plug 10a used in a direct injection type diesel engine is manufactured through cutting, a high cutting amount is required, thereby causing significant deterioration in productivity while increasing processing costs.

Particularly, if high strength materials are used to manufacture a metal shell so as to prevent warpage in mounting the metal shell 100a on an engine, this aggravates problems of deterioration in productivity and increase in processing costs as mentioned above.

On the other hand, when the metal shell 100a having a long overall length is manufactured by forging, a larger mold and a thinner punch are required, thereby causing damage to the mold and thus making it difficult to perform forging of the metal shell 100a. Moreover, the metal shell fails to reach desired design strength.

As described above, as the overall length of the metal shell is increased corresponding to the trend of transition from indirect injection type diesel engines to direct injection type diesel engines, an existing metal shell 100 structure raises several problems when employing typical processing methods as mentioned above causing increase in time and costs or deterioration in processability and productivity, which eventually reduces product competitiveness. Therefore, there is a need for an improved metal shell structure.

DISCLOSURE

Technical Problem

The present invention has been conceived to overcome the aforementioned problems in the related art, and it is an object of the present invention to provide a metal shell of a glow plug fastened to an engine head of a diesel engine, wherein the metal shell has a multi-stage structure allowing good processability regardless of overall length of the metal shell and allowing the metal shell to have different strength in part or in section, thereby providing improved strength and durability, and a method of manufacturing the same. In other words, the present invention is aimed at providing a metal shell which has a segmented structure, i.e. a structure wherein a plurality of metal shell segments (sections) are axially connected and fixed to each other so as to reinforce a portion requiring higher strength than other portions.

Technical Solution

In accordance with one aspect of the present invention, a metal shell of a glow plug fastened to an engine head of a diesel engine includes a plurality of metal shell sections disposed in an axial direction of the glow plug and having different material strengths.

The plurality of metal shell sections may include: an upper metal shell section having a thread on an outer circumferential surface thereof for fastening to the engine head of the diesel engine; and at least one lower metal shell section directly coupled to a lower side of the upper metal shell section or indirectly coupled thereto via other metal shell sections and having different material strength than the upper metal shell section.

The lower metal shell section may be formed of a material having higher strength than the upper metal shell section. Specifically, the upper metal shell section may be formed of a steel wire rod for cold forging, and the lower metal shell section may be formed of a carbon steel wire rod for cold forging.

The plurality of metal shell sections may be joined into one piece in the axial direction of the glow plug.

The plurality of metal shell sections may have a shape-matched stepped portion formed at a joint to other adjacent metal shell sections for coupling to the other adjacent metal shell sections.

When the metal shell section having the thread for fastening to the engine head is a first metal shell section, the metal shell section connected to a lower side of the first metal shell section is a second metal section, and the metal shell section connected to a lower side of the second metal shell section is a third metal shell section, the first metal shell section may be formed of a steel wire rod for cold forging, and the second metal shell section and the third metal shell section may be formed of a carbon steel wire rod for cold forging.

In another aspect of the present invention, a glow plug for diesel engines includes the metal shell as set forth above.

In a further aspect of the present invention, a method of manufacturing a metal shell of a glow plug, which has a thread on an upper outer circumferential surface thereof for fastening to an engine head of a diesel engine and an axial through-hole for receiving a heating pin, includes: separately fabricating an upper metal shell section having the thread and a lower metal shell section coupled to a lower side of the upper metal shell section to form the metal shell; and joining the upper and lower metal shell sections into one piece by laser welding, thereby forming the metal shell.

Each of the upper and lower metal shell sections may be fabricated by forging. In addition, the lower metal shell section may be formed of a material having different strength than the upper metal shell section.

In accordance with a more specific aspect of the present invention, a metal shell of a glow plug for diesel engines has a thread formed on an upper outer circumferential surface thereof for fastening to an engine head of a diesel engine and is configured to receive a heating pin, wherein the metal shell of the glow plug is formed into one piece through connection of separate metal shell sections constituting a multi-stage structure, and at least two of the metal shell sections have different material strengths.

In the above features, the metal shell section having the thread is formed of a material having lower strength than other metal shell sections having no thread. In other words, the metal shell sections having no thread are formed of a material having higher strength than the metal shell section having the thread.

In accordance with yet another specific aspect of the present invention, a method of manufacturing a metal shell of a glow plug for diesel engines, which has a thread on an upper outer circumferential surface thereof for fastening to an engine head of a diesel engine and is configured to receive a heating pin, includes: separately fabricating a metal shell section having the thread and a metal shell section to be joined to the metal shell section having the thread; and connecting the metal shell section having the thread to the metal shell section to be joined thereto and joining the metal shell sections into one piece by laser welding.

Advantageous Effects

A metal shell of a glow plug for diesel engines, a glow plug including the same, and a method of manufacturing the same provide the following effects.

According to the present invention, the metal shell of a glow plug fastened to an engine head of a diesel engine can be easily manufactured regardless of overall length of the metal shell.

In other words, in manufacture of a metal shell having a long overall length corresponding to the trend of transition from indirect injection type diesel engines to direct injection type diesel engines, the metal shell according to the present invention has a multi-stage structure such that sections of the metal shell can be easily fabricated by forging and then easily joined into one piece by various joining methods such as laser welding, thereby improving productivity and processability.

In addition, the metal shell according to the present invention has a structure in which metal shell sections are axially joined into one piece such that reinforcement of a portion requiring high strength or subjected to high stress can be achieved using different materials. More specifically, a metal shell section fastened to an engine head and the other metal shell sections are formed of materials having different strengths, thereby effectively preventing warpage of the metal shell in fastening of the metal shell to an engine head.

That is, the other metal shell sections, which are likely to suffer warpage due to compressive load, are formed of a material having relatively high strength as compared with a material of the metal shell section fastened to an engine head, thereby preventing warpage of the metal shell that occurs in a typical glow plug.

Further, according to the present invention, the metal shell sections can be easily fabricated by forging, thereby improving productivity while reducing manufacturing costs.

BEST MODE

Hereinafter, embodiments of the present invention will be described in detail with reference to FIGS. 4 to 7.

Figure 1:
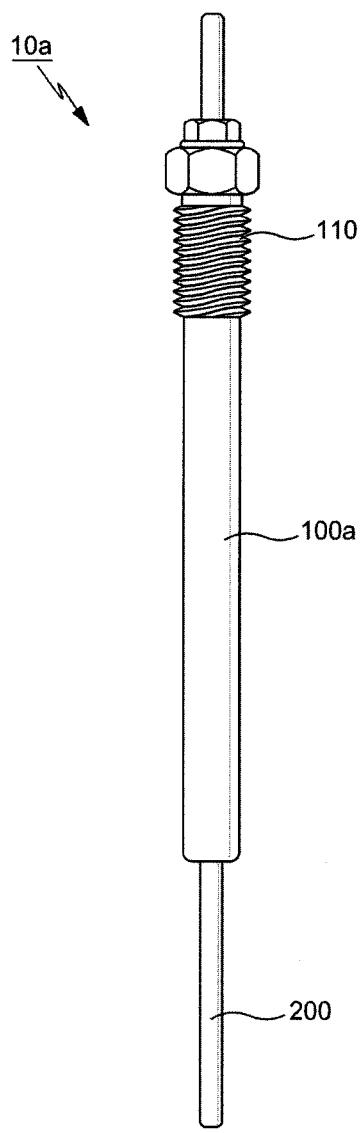
FIG. 1 is a front view of a typical glow plug.
Figure 2:
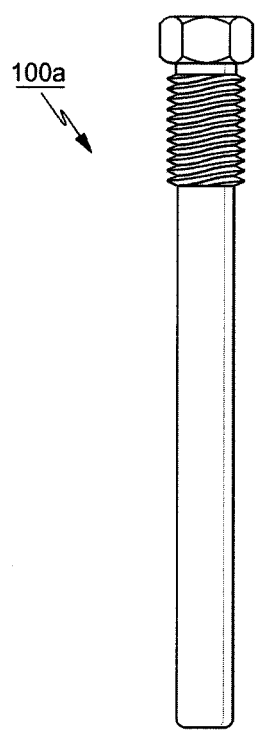
FIG. 2 is a front view of a unitary metal shell used in the glow plug in FIG. 1.
Figure 3:
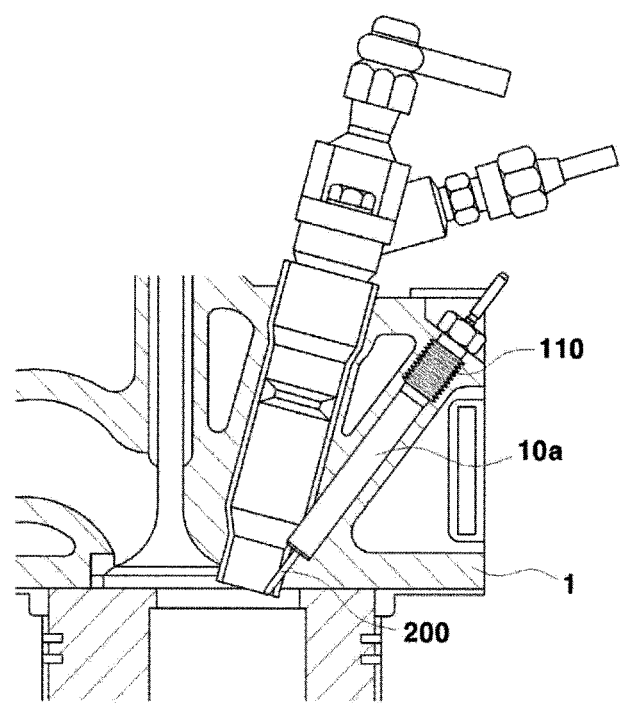
FIG. 3 is a sectional view showing a state in which the glow plug of FIG. 1 is mounted on an engine.
Figure 4:
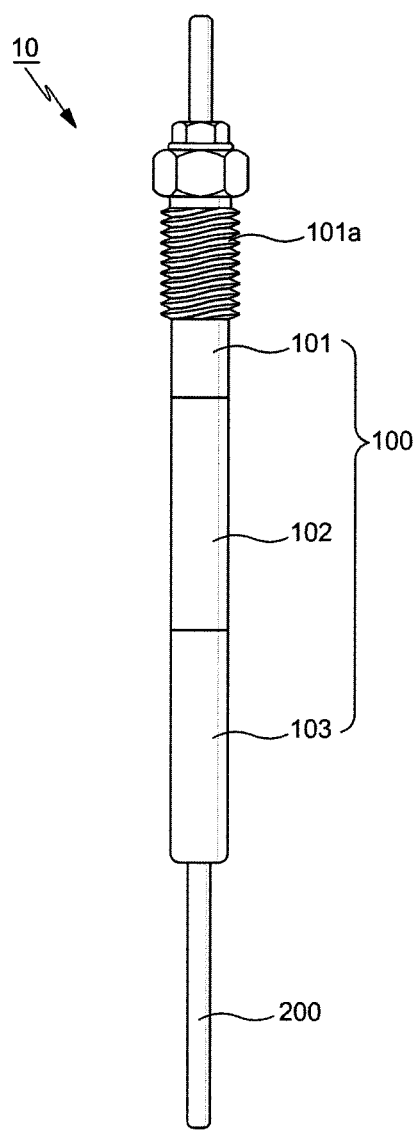
FIG. 4 is a front view of a glow plug including a metal shell according to one embodiment of the present invention.
Figure 5:
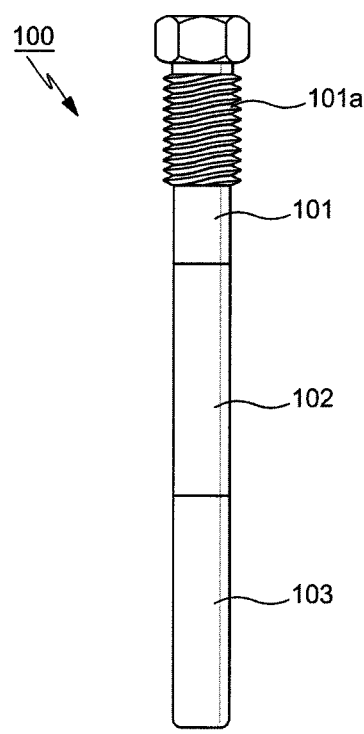
FIG. 5 is a front view of the metal shell according to the embodiment of the present invention.
Figure 6:
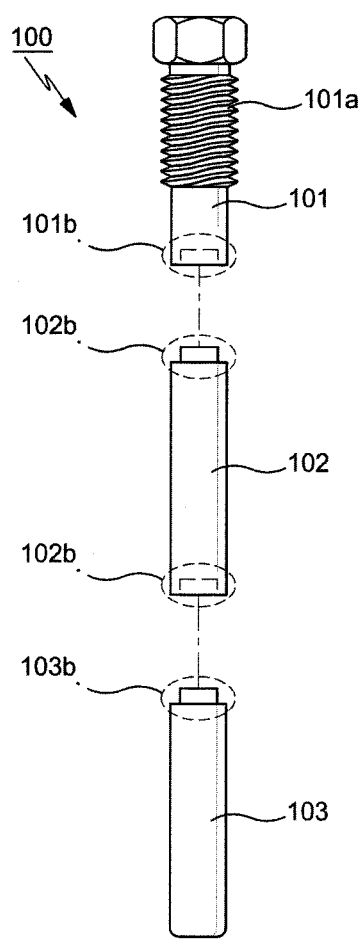
FIG. 6 is an exploded view of the metal shell shown in FIG. 5.
Figure 7:
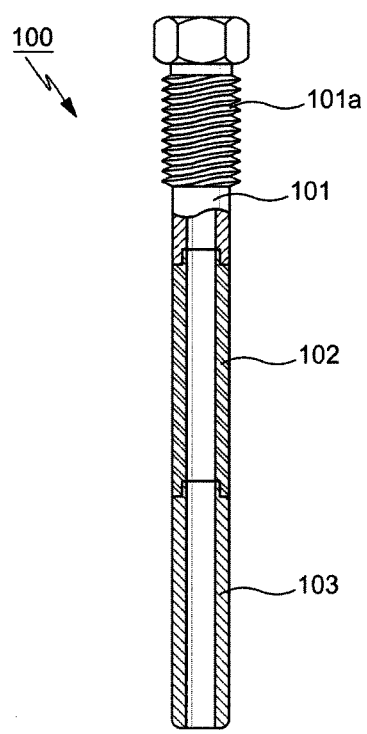
FIG. 7 is a sectional view of the metal shell shown in FIG. 5.

Referring to FIGS. 4 to 7, there are shown a metal shell 100 of a glow plug for diesel engines fastened to an engine head 1 (see FIG. 3) of a diesel engine and a glow plug 10 including the same. The metal shell 100 is disposed in an axial direction (longitudinal direction) of the glow plug 10 and includes a plurality of metal shell sections 101, 102, 103 having different material strengths.

The plurality of metal shell sections 101, 102, 103 includes an upper metal shell section 101 having a thread 101a formed on an outer circumferential surface thereof for fastening to the engine head 1 and lower metal shell sections 102, 103 directly coupled to a lower side of the upper metal shell section 101 or indirectly coupled thereto via the other metal shell section. In addition, at least one of the lower metal shell sections 102, 103 has different material strength than the upper metal shell section 101.

More specifically, the metal shell 100 of the glow plug 10 according to the embodiment of the invention has the thread 101a on an upper outer circumferential surface thereof for fastening to the engine head 1 of a diesel engine and is configured to receive a heating pin 200 therein. Here, the metal shell 100 has a multi-stage structure (structure in which at least two metal shell sections are axially coupled to each other), wherein the metal shell sections are joined into one piece by screwing, welding, and the like. In other words, the metal shell 100 includes a metal shell section having the thread 101a, i.e. the upper metal shell section 101 and at least one metal shell section fixedly coupled to the lower side of the upper metal shell section, i.e. the lower metal shell sections 102, 103, wherein the upper and lower metal shell sections are formed of materials having different strengths. Although the metal shell includes two lower metal shell sections in this embodiment, it should be understood that the metal shell may include three or more lower metal shell sections depending upon desired overall-length (length) of the metal shell 100.

Here, preferably, the lower metal shell sections 102, 103 consecutively coupled to the lower side of the upper metal shell section 101 are formed of a material having higher strength than the upper metal shell section 101. When the lower metal shell sections 102, 103 have a structure including plural metal sections, i.e. a multi-stage structure, the metal shell sections 102, 103 may be formed of the same material or formed of different materials to have a structure in which metal shell sections formed of different materials are connected to each other. For example, among the metal shell sections 102, 103, the section 102 directly coupled to the upper metal shell section 101 may be formed of the same material as the upper metal shell section 101, and the section 103 indirectly coupled to the upper metal shell section 101 via the section 102 may be formed of a different material than the upper metal shell section 101.

The plurality of metal shell sections 101, 102, 103 may be axially joined into one piece by various joining methods such as laser welding.

In addition, each of the plurality of metal shell sections 101, 102, 103 has a shape-matched stepped portion, i.e. a stepped portion having a corresponding shape at a joining site (joint) to other adjacent metal shell sections for coupling to the other adjacent metal shell sections.

Specifically, the metal shell sections are provided at the joints (joining sites) thereof with stepped portions 101b, 102b, 103b, respectively, to aid in assembly to other metal shell sections adjacent thereto. Here, each of the stepped portions 101b, 102b, 103b has a convex or concave structure, which allows a joint of one section to be engaged with joints of other sections adjacent thereto prior to welding between the sections.

More specifically, the metal shell 100 of the glow plug 10 according to this embodiment has a three-stage structure. When the metal shell section having the thread 101a is a first metal shell section 101, the metal shell section connected to a lower side of the first metal shell section 101 is a second metal shell section, and the metal shell section connected to a lower side of the second metal shell section 102 is a third metal shell section 103, the first metal shell section 101 may be formed of a steel wire rod for cold forging (for example, SWRCH10A), and the second metal shell section 102 and the third metal shell section 103 may be formed of a carbon steel wire rod for cold forging (for example, SWCH45K), whereby partial strength enhancement can be easily achieved.

The first metal shell section 101, the second metal shell section 102, and the third metal shell section 103 constituting the metal shell 100 may have a length ratio of 0.4~0.6: 1:1 in consideration of material and processability of the metal shell sections, without being limited thereto.

Next, a method of manufacturing a metal shell 100 of a glow plug 10 according to one embodiment of the present invention will be described.

The metal shell 100 of the glow plug 10 for diesel engines according to the embodiment of the invention has a thread 101a formed on an upper outer circumferential surface thereof for fastening to an engine head of a diesel engine and is configured to receive a heating pin 200 therein, wherein an upper metal shell section 101 having the thread 101a and a lower metal shell section 102, 103 connected to a lower side of the upper metal shell section 101 to form the metal shell 100 together with the upper metal shell section 101 are manufactured separately. Each of the upper metal shell section 101 and the lower metal shell sections 102, 103 is manufactured by forging. When the lower metal shell sections 102, 103 have a multi-stage structure as in this embodiment, metal shell sections of the lower metal shell sections are also manufactured separately.

Then, the upper metal shell section 101 and the lower metal shell sections 102, 103 are joined into one piece by various methods such as laser welding, thereby completing the metal shell 100.

Specifically, the first metal shell section 101 having the thread 101a for fastening to the engine head 1, the second metal shell section 102 to be joined to the first metal shell section 101, and the third metal shell section 103 to be joined to the second metal shell section 102 are separately fabricated.

Here, each of the first metal shell section 101, the second metal shell section 102, and the third metal shell section 103 may be fabricated by forging, without being limited thereto.

Then, the first metal shell section 101, the second metal shell section 102, and the third metal shell section 103 are placed in contact with and aligned with each other. Here, the first metal shell section 101, the second metal shell section 102, and the third metal shell section 103 can be easily assembled to each other due to the respective stepped portions 101b, 102b, 103b.

After the first to third metal shell sections 101, 102, 103 are assembled to each other, the metal shell sections are joined into one piece by laser welding or the like, thereby completing the metal shell 100.

Next, effects of the metal shell 100 of the glow plug 10 according to the invention will be described.

The metal shell 100 of the glow plug 10 according to the present invention has a multi-stage structure such that a plurality of short metal shell sections can be separately and easily fabricated by forging and then joined into one piece, thereby improving productivity while reducing manufacturing costs.

In other words, the metal shell 100 according to the present invention has a segmented structure, which allows improvement in productivity and processability even in manufacture of a metal shell 100 of a glow plug 10 having an increased length corresponding to transition of a fuel injection method of diesel engines through a process in which metal shell sections are separately fabricated by forging and then easily joined into one piece by laser welding.

Thus, the present invention allows the metal shell of the glow plug 10 mounted on the engine head 1 to be easily manufactured regardless of the overall length of the metal shell.

In addition, the metal shell 100 according to the present invention has a segmented structure which allows a portion requiring increased strength to be formed of a different material than other portions such that the metal shell can be partially reinforced, thereby preventing warpage of the metal shell while improving durability.

In other words, a metal shell section directly fastened to an engine head is formed of a material having relatively low strength, and at least one of the other metal shell sections receiving compressive load in fastening of the metal shell is formed of a material having relatively high strength, thereby preventing warpage of the metal shell.

Further, in the method of manufacturing a metal shell of a glow plug 10 according to the present invention, separately fabricated metal shell sections are joined into one piece, and a metal section corresponding to a portion of the metal shell receiving high load is formed of a material having high strength, thereby improving fastening strength of the glow plug 10 to an engine head.

It should be understood that the foregoing embodiments are provided for illustration only and are not to be in any way construed as limiting the present invention, and that various modifications and changes can be made without departing from the spirit and scope of the invention.

For example, although the present invention has been described by way of example wherein the metal shell 100 has a three-stage structure, the present invention is not limited thereto. In addition, although the present invention has been described above by way of an example wherein the first metal shell section 101, the second metal shell section 102, and the third metal shell section 103 are fabricated by forging in consideration of productivity, it should be understood that the metal shell sections may be fabricated by cutting.

Further, although the present invention has been described by way of example wherein the first metal shell section 101, the second metal shell section 102, and the third metal shell section 103 of the metal section 100 have the same thickness, it should be understood that the metal shell sections 101, 102, 103 may have different thicknesses. Particularly, when the metal shell sections are formed of the same material, the metal shell sections may have different thicknesses in consideration of strength of each of the sections and shape of the heating pin 200.

Therefore, the scope of the invention is defined only by the appended claims rather than the detailed description, and all changes or variations derived from the meaning and range and equivalents of the appended claims should be interpreted as within the scope of the invention

INDUSTRIAL APPLICABILITY

A metal shell of a glow plug mounted on a head of a diesel engine according to the present invention has a multi-stage structure which allows easy manufacture of the metal shell regardless of overall length of the metal shell and also allows the metal shell to have different strength in part, thereby improving strength and durability of the metal shell while improving productivity while reducing manufacturing costs, and thus can be applied to the fields of design/manufacture of automotive components and automobile fields.

The invention claimed is:

1. A metal shell of a glow plug fastened to an engine head of a diesel engine, comprising:
   a plurality of metal shell sections disposed in an axial direction of the glow plug and having different material strengths,
   wherein the plurality of metal shell sections comprise a first metal section having a thread for fastening to the engine head, a second metal shell section connected to a lower side of the first metal shell section, and a third metal shell section connected to a lower side of the second metal shell section,
   wherein the first metal shell section is formed of a steel wire rod for cold forging and the second and third metal shell sections are formed of a carbon steel wire rod for cold forging.

2. The metal shell according to claim 1, wherein a strength of the carbon steel wire rod is higher than a strength of the steel wire rod.

3. The metal shell according to claim 1, wherein the plurality of metal shell sections are joined into one piece in the axial direction of the glow plug.

4. The metal shell according to claim 1, wherein each of the plurality of metal shell sections has a shape-matched stepped portion formed at a joint to other adjacent metal shell sections for coupling to the other adjacent metal shell sections.

5. The metal shell according to claim 1, wherein the plurality of metal shell sections is formed of different materials to partially improve strength of the metal shell.

6. A glow plug for diesel engines comprising the metal shell according to claim 1.

7. A method of manufacturing a metal shell of a glow plug, the metal shell having a thread formed on an upper outer circumferential surface thereof for fastening to an engine head of a diesel engine and an axial through-hole for receiving a heating pin, the method comprising:
   separately fabricating a plurality of metal shell sections comprising a first metal section having a thread for fastening to the engine head, a second metal shell section to be coupled to a lower side of the first metal shell section, and a third metal shell section to be coupled to a lower side of the second metal shell section, wherein the first metal shell section is formed on a steel wire rod for cold forging and the second and third metal shell sections are formed of a carbon steel wire rod for cold forging; and
   joining the first, second, and third metal shell sections into one piece by laser welding.

8. The method according to claim 7, wherein each of the first second, and third metal shell sections is fabricated by forging.

9. The method according to claim 7, wherein a strength of the carbon steel wire rod is higher than a strength of the steel wire rod.

10. The method according to claim 8, wherein a strength of the carbon steel wire rod is higher than a strength of the steel wire rod.

* * * * *